United States Patent
Moon (10) Patent No.: US 10,330,026 B2
(45) Date of Patent: Jun. 25, 2019

(54) METHOD OF CONTROLLING VALVE TIMING AND VALVE DURATION USING CVVT APPARATUS AND CVVD APPARATUS

(71) Applicants: HYUNDAI MOTOR COMPANY, Seoul (KR); KIA MOTORS CORPORATION, Seoul (KR)

(72) Inventor: Chi-Ho Moon, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/809,653

(22) Filed: Nov. 10, 2017

(65) Prior Publication Data
US 2018/0163642 A1 Jun. 14, 2018

(30) Foreign Application Priority Data
Dec. 14, 2016 (KR) .................. 10-2016-0170712

(51) Int. Cl.
| | |
|---|---|
| *F02D 13/02* | (2006.01) |
| *F01L 1/047* | (2006.01) |
| *F01L 1/344* | (2006.01) |
| *F01L 13/00* | (2006.01) |
| *F01L 1/26* | (2006.01) |
| *F01L 1/46* | (2006.01) |
| *F01L 1/053* | (2006.01) |

(52) U.S. Cl.
CPC .......... *F02D 13/0211* (2013.01); *F01L 1/047* (2013.01); *F01L 1/344* (2013.01); *F01L 1/3442* (2013.01); *F01L 13/00* (2013.01); *F01L 13/0015* (2013.01); *F01L 1/267* (2013.01); *F01L 1/46* (2013.01); *F01L 2001/0473* (2013.01); *F01L 2001/0537* (2013.01); *F01L 2800/00* (2013.01); *F02D 13/0215* (2013.01); *Y02T 10/18* (2013.01)

(58) Field of Classification Search
CPC . F01L 1/267; F01L 1/3442; F01L 1/46; F01L 13/00; F02D 13/0215
USPC ................................ 123/90.16, 90.17, 90.27
See application file for complete search history.

(56) References Cited

U.S. PATENT DOCUMENTS

| | | | | |
|---|---|---|---|---|
| 4,836,155 | A * | 6/1989 | Slagley | F01L 13/0063 123/90.16 |
| 5,099,805 | A * | 3/1992 | Ingalls | F01L 1/042 123/90.15 |
| 5,233,948 | A * | 8/1993 | Boggs | F02B 41/04 123/432 |

(Continued)

FOREIGN PATENT DOCUMENTS

KR    10-2013-0063819 A    6/2013

*Primary Examiner* — Jorge L Leon, Jr.
(74) *Attorney, Agent, or Firm* — Morgan, Lewis & Bockius LLP (57) ABSTRACT

A method of controlling valve timing and valve duration using a CVVT apparatus and a CVVD apparatus, the CVVT apparatus being configured to adjust an opening time of a valve in a vehicle engine, the CVVD apparatus being configured to adjust a duration of a valve lift, the method may include determining a desired valve opening time and a desired valve closing time; determining a desired valve duration by the desired valve opening time and the desired valve closing time; determining a desired valve timing through the desired valve opening time and an actual valve duration measured in real time; and controlling the CVVD apparatus to accomplish the desired valve duration while controlling the CVVT apparatus to accomplish the desired valve timing.

6 Claims, 6 Drawing Sheets

(56) References Cited

U.S. PATENT DOCUMENTS

| | | | | |
|---|---|---|---|---|
| 5,572,962 | A * | 11/1996 | Riley | F01L 13/0021 123/90.16 |
| 5,992,361 | A * | 11/1999 | Murata | F01L 1/356 123/90.15 |
| 6,352,060 | B1 * | 3/2002 | Bentley | F01L 1/34406 123/90.15 |
| 6,474,281 | B1 * | 11/2002 | Walters | F01L 1/143 123/90.17 |
| 7,178,493 | B2 * | 2/2007 | Kang | F02D 13/0253 123/90.15 |
| 7,322,323 | B2 * | 1/2008 | Kawasaki | F02D 13/023 123/90.15 |
| 8,726,864 | B2 * | 5/2014 | Cho | F02D 13/0203 123/90.15 |
| 2007/0101957 | A1 * | 5/2007 | Shui | F01L 1/022 123/90.16 |
| 2007/0157896 | A1 * | 7/2007 | Fuwa | F01L 1/185 123/90.16 |
| 2008/0141960 | A1 * | 6/2008 | Rohe | F01L 1/024 123/90.16 |
| 2008/0184947 | A1 * | 8/2008 | Gecim | F01L 1/356 123/90.17 |
| 2008/0271688 | A1 * | 11/2008 | Wermuth | F02B 1/06 123/90.16 |
| 2008/0308053 | A1 * | 12/2008 | Tsuchida | F01L 1/022 123/90.17 |
| 2013/0000575 | A1 * | 1/2013 | Park | F01L 1/3442 123/90.15 |
| 2013/0025403 | A1 * | 1/2013 | Wigsten | F01L 1/047 74/568 R |
| 2013/0146006 | A1 * | 6/2013 | Kim | F01L 1/0532 123/90.17 |
| 2014/0190429 | A1 * | 7/2014 | Khajepour | F01L 9/02 123/90.12 |
| 2015/0068474 | A1 * | 3/2015 | Kim | F01L 1/047 123/90.15 |
| 2015/0176442 | A1 * | 6/2015 | Kwak | F01L 1/34413 123/90.17 |

* cited by examiner

METHOD OF CONTROLLING VALVE TIMING AND VALVE DURATION USING CVVT APPARATUS AND CVVD APPARATUS

CROSS-REFERENCE TO RELATED APPLICATIONS

This application claims priority to Korean Patent Application No. 10-2016-0170712, filed on Dec. 14, 2016, which is incorporated herein by reference in its entirety.

BACKGROUND OF THE INVENTION

Field of the Invention

Exemplary embodiments of the present invention relate to a method of controlling valve timing and valve duration using a continuously variable valve timing (CVVT) apparatus and a continuously variable valve duration (CVVD) apparatus; and, particularly, to a method of controlling valve timing and valve duration using a CVVT apparatus, which adjusts a valve opening time of a vehicle engine, and a CVVD apparatus which adjusts duration of a valve lift.

Description of Related Art

An internal combustion engine generates power by burning fuel and air that are supplied into a combustion chamber. An intake valve is operated by driving a camshaft for suction of air, and fuel and air are introduced into the combustion chamber while the intake valve is open. An exhaust valve is operated by driving the camshaft, and air is discharged from the combustion chamber after combustion while the exhaust valve is open.

In general, a valve switching timing is fixed such that the engine is able to obtain maximum power in a specific revolution per minute (rpm) range. Accordingly, the valve switching timing must be retarded in a low rpm range for expansion and explosion of a mixture, whereas it must be advanced in a high rpm range for discharge of the mixture after the explosion. However, if the valve timing is adjusted to be retarded, the discharge of the mixture is delayed when the engine rotates at a high speed, and if the valve is adjusted to be advanced, the compression of the mixture is delayed when the engine rotates at a low speed. As a result, the efficiency of the engine is too low.

To resolve such a problem, there has been proposed a continuously variable valve timing (CVVT) technology that changes a valve switching timing to be suitable for an engine rpm in a state in which a valve duration is fixed in order to obtain high fuel efficiency and power at both high and low speeds. Although the CVVT technology may effectively control a valve opening time, it may not change a valve duration.

To change the valve duration, there has been developed a continuously variable valve lift (CVVL) system that allows valves to be operated by different lifts according to the engine rpm. However, since a valve duration is varied but a valve lift is simultaneously changed in the CVVL system, the CVVL system has a low degree of freedom in regard of control.

To resolve such a problem, there has been developed a continuously variable valve duration (CVVD) apparatus as disclosed in Patent Document 1. The CVVD apparatus may effectively vary a valve timing and a valve duration without changing a valve lift by interlocking with a CVVT apparatus. In addition, the CVVD apparatus may set an optimum valve switching timing by independently controlling valve opening and closing times.

However, when the valve timing and the valve duration are adjusted using the CVVD and the CVVT, a desired valve timing may not be obtained due to a change in valve timing when the valve duration is varied. However, the method of controlling valve timing and valve duration using CVVD and CVVT has not been sufficiently studied to the present time.

PRIOR ART DOCUMENT

Patent Document (Patent Document 1) Korean Patent Application Publication No. 10-2013-0063819 (Jun. 17, 2013)

SUMMARY OF THE INVENTION

An embodiment of the present invention is directed to a method of controlling valve timing and valve duration using a CVVT apparatus and a CVVD apparatus, in which a valve timing and a valve duration can be optimally controlled according to the operation state of an engine.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method of controlling valve timing and valve duration using a CVVT apparatus and a CVVD apparatus, the CVVT apparatus being configured to adjust an opening time of a valve in a vehicle engine, the CVVD apparatus being configured to adjust a duration of a valve lift, the method comprising: determining, by a processor, a desired valve opening time and a desired valve closing time; determining, by the processor, a desired valve duration by the desired valve opening time and the desired valve closing time; determining, by the processor, a desired valve timing through the desired valve opening time and an actual valve duration measured in real time; and controlling, by the processor, the CVVD apparatus to accomplish the desired valve duration while controlling the CVVT apparatus to accomplish the desired valve timing.

The CVVD apparatus may adjust a valve duration by fixing a peak lift of the valve and changing opening and closing times of the valve.

The CVVD apparatus may adjust a valve duration by fixing a closing time of the valve and changing an opening time of the valve.

In accordance with another embodiment of the present invention, a system of controlling valve timing and valve duration using a CVVT apparatus and a CVVD apparatus, the CVVT apparatus being configured to adjust an opening time of a valve in a vehicle engine, the CVVD apparatus being configured to adjust a duration of a valve lift, the system comprises a controller that includes a processor configured to perform: determining a desired valve opening time and a desired valve closing time; determining a desired valve duration by the desired valve opening time and the desired valve closing time; determining a desired valve timing through the desired valve opening time and an actual valve duration measured in real time; and controlling the CVVD apparatus to accomplish the desired valve duration while controlling the CVVT apparatus to accomplish the desired valve timing. The CVVD apparatus adjusts a valve duration by fixing a peak lift of the valve and changing opening and closing times of the valve. The CVVD apparatus adjusts a valve duration by fixing a closing time of the valve and changing an opening time of the valve.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1:
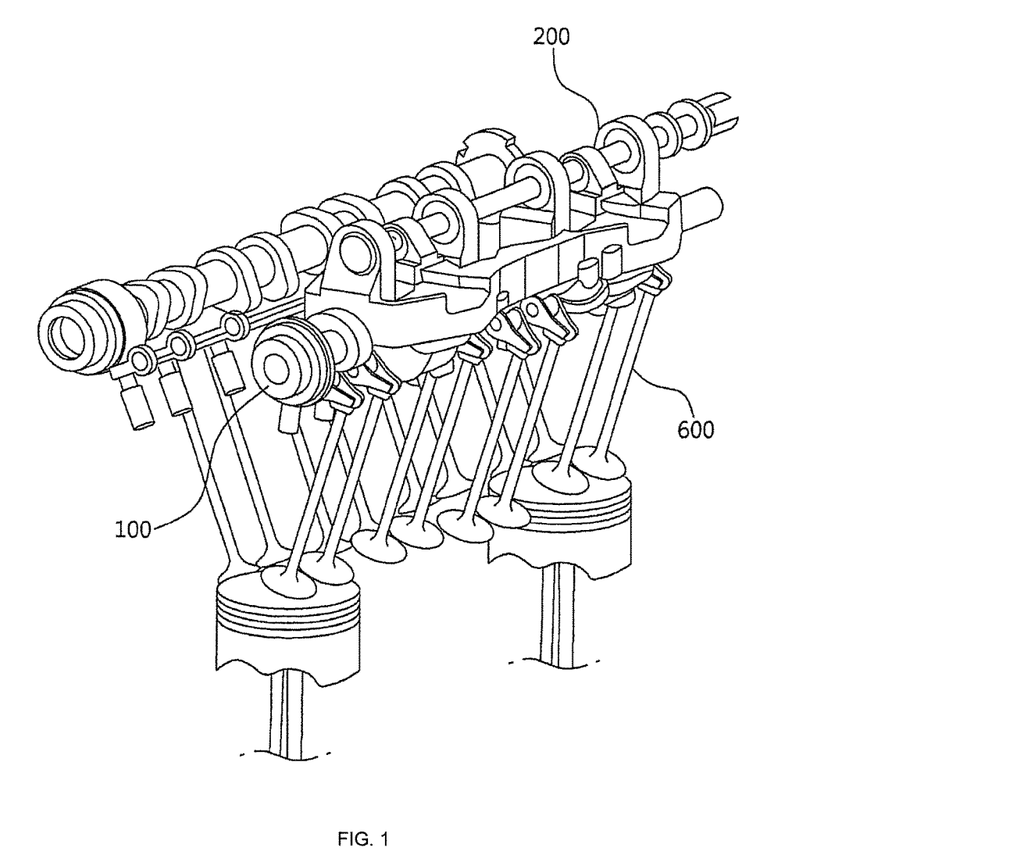
FIG. 1 shows a perspective view illustrating a portion of an engine that includes a CVVT apparatus and a CVVD apparatus in a method of controlling valve timing and valve duration using a CVVT apparatus and a CVVD apparatus according to an embodiment.

FIG. 1 shows a perspective view illustrating a portion of an engine that includes a continuously variable valve timing (CVVT) apparatus 100 and a continuously variable valve duration (CVVD) apparatus 200 in a method of controlling valve timing and valve duration using a CVVT apparatus 100 and a CVVD apparatus 200 according to an embodiment. As illustrated in FIG. 1, the internal combustion engine includes a valve 600 that allows intake/exhaust air to be introduced into/discharged from a combustion chamber, a CVVT apparatus 100 that adjusts an opening time of the valve 600, and a CVVD apparatus 200 that adjusts a duration of a valve lift.

Figure 2A:
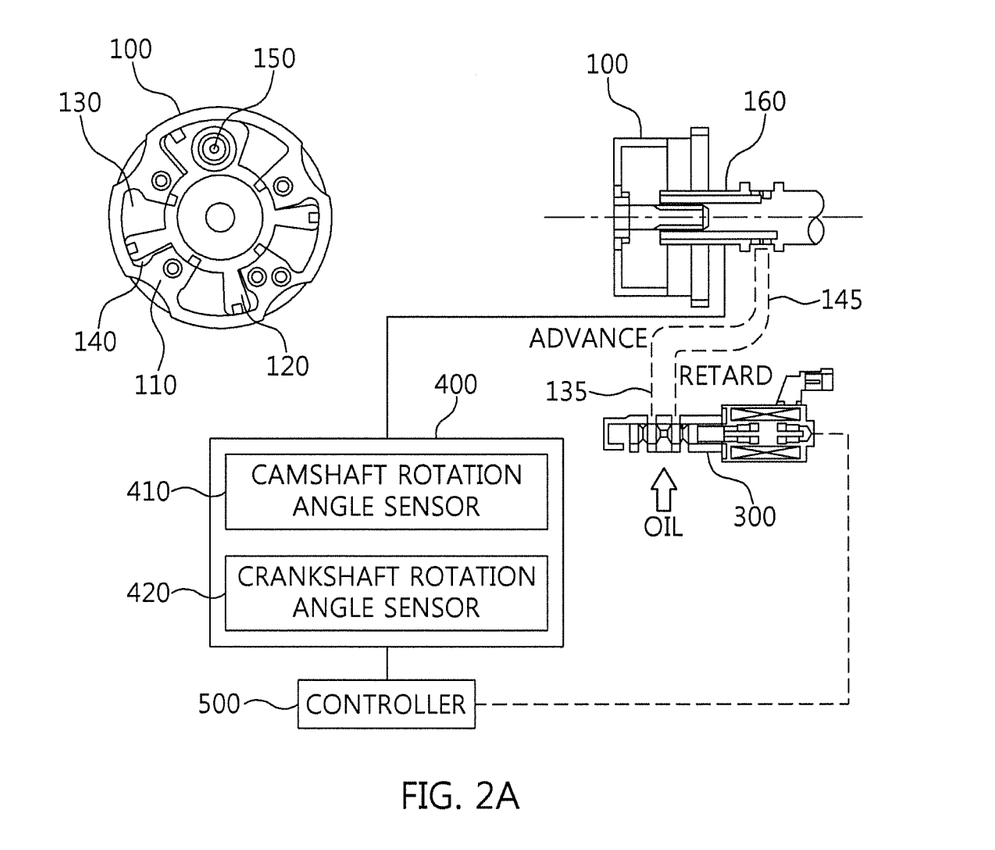
FIG. 2A shows a view illustrating a configuration of the CVVT apparatus in the method according to the embodiment of the present invention.
Figure 2B:
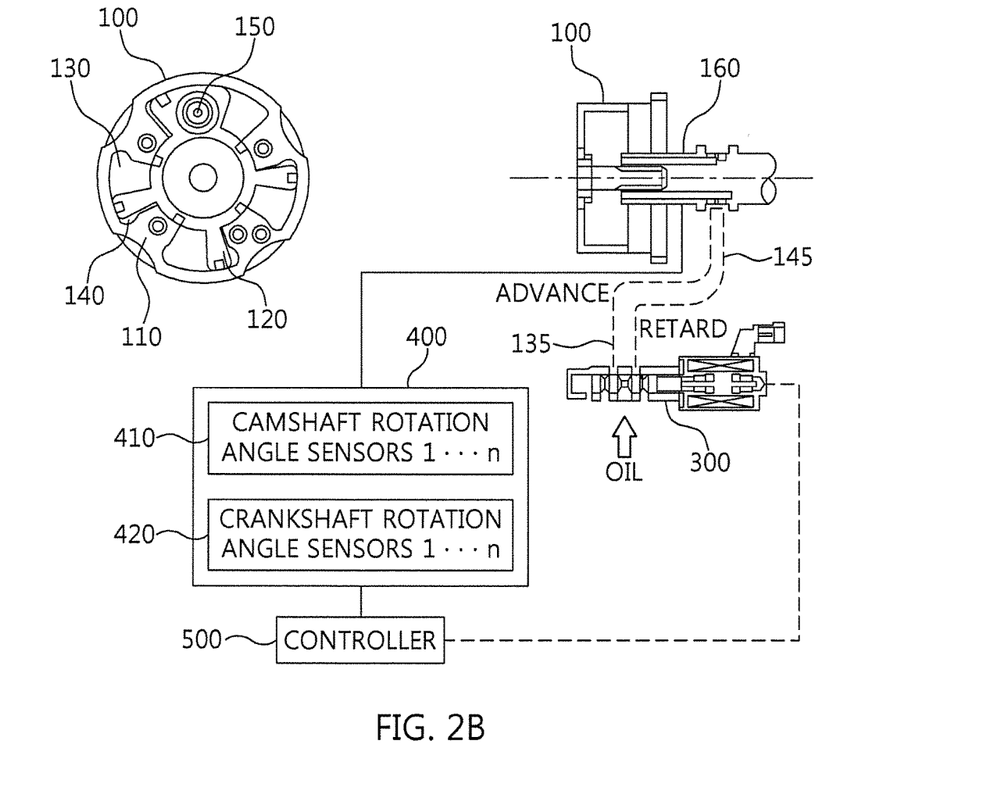
FIG. 2B shows a view illustrating a configuration of the CVVT apparatus in the method according to another embodiment of the present invention.

FIGS. 2A and 2B show a view illustrating the configuration of the CVVT apparatus 100 in the method according to the embodiments of the present invention. Referring to FIGS. 2A and 2B, a system having the CVVT apparatus 100 connected to one end of a camshaft 160 that controls the opening and closing of the valve 600, and connected to an oil control valve 300, a valve timing detection unit 400, and a controller 500 that includes a processor and/or electric circuitries which perform various function described below by execution of instructions embedded thereon and controlling the oil control valve 300 and the valve timing detection unit 400.

In addition, the CVVT apparatus 100 includes a housing 110, and a rotor vane 120 that is connected to one end of the camshaft 160 of an intake/exhaust valve (not shown) and is inserted into the inner periphery of the housing 110.

The housing 110 has a plurality of advance and retard chambers 130 and 140 that are formed therein as spaces divided by respective vanes of the rotor vane 120. A lock device 150, which fixes a phase of rotation of the camshaft 160 relative to a crankshaft (not shown) of the engine at a specific angle, is formed in at least a portion of the vanes of the rotor vane 120.

The CVVT apparatus 100 regulates a supply amount of oil that is supplied from the oil control valve 300 to the advance and retard chambers 130 and 140 of the CVVT apparatus 100 through advance and retard passages 135 and 145, so as to vary a valve timing by changing the phase of rotation of the camshaft 160 relative to the crankshaft between the most advanced phase and the most retarded phase.

In more detail, when the valve timing is changed to be advanced, the oil control valve 300 blocks the retard passage 145 through which oil is supplied to the retard chambers 140, and meanwhile opens the advance passage 135 according to duty control for supply of oil to the advance chambers 130 to advance the phase of the camshaft by changing the hydraulic pressure in the advance chambers 130.

In addition, when the valve timing is changed to be retarded, the oil control valve 300 blocks the advance passage 135 through which oil is supplied to the advance chambers 130, and meanwhile opens the retard passage 145 according to duty control for supply of oil to the retard chambers 140 to advance the phase of the camshaft by changing the hydraulic pressure in the retard chambers 140.

The controller 500 calculates an optimum valve timing according to the rpm range of the engine to set a desired valve timing based on the same. The controller 500 calculates the angle that is required to change the phase of rotation of the camshaft 160 so as to reach the desired valve timing, and controls the oil control valve 300 based on the same.

The valve timing detection unit 400 includes a camshaft rotation angle sensor system 410 that includes at least one camshaft rotation angle sensor (i.e. sensors 1 to n where n being a natural number in FIG. 2B) and detects an angle of rotation of the camshaft, and a crankshaft rotation angle sensor system 420 that includes at least one crankshaft rotation angle sensor (i.e. sensors 1 to n where n being a natural number in FIG. 2B) and detects an angle of rotation of the crankshaft.

The controller 500 may calculate an actual change angle of the valve timing by the CVVT apparatus 100 by reading the angle of rotation of the camshaft and the angle of rotation of the crankshaft from the camshaft rotation angle sensor system 410 and the crankshaft rotation angle sensor system 420, respectively, and then by reducing the angle of rotation of the crankshaft from the angle of rotation of the camshaft.

Figure 3:
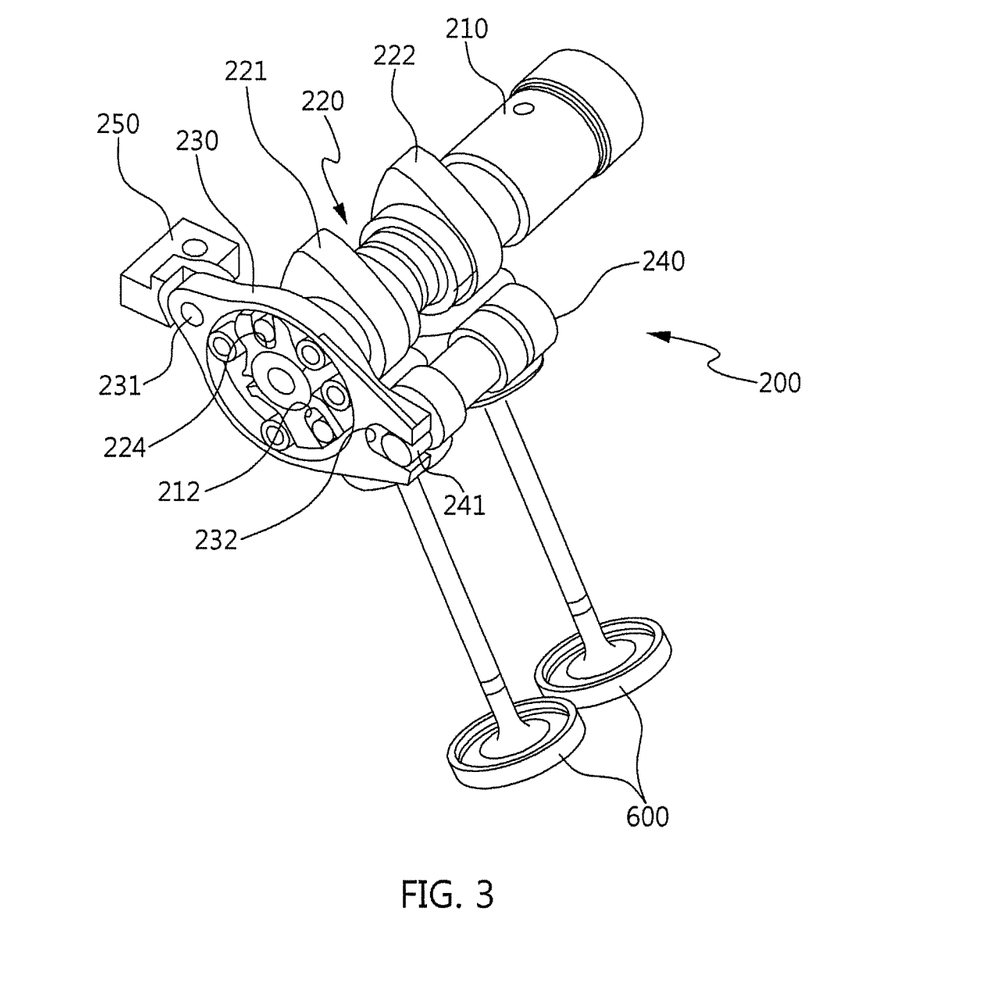
FIG. 3 shows a view schematically illustrating a configuration of the CVVD apparatus in the method according to the embodiment of the present invention.

FIG. 3 shows a view schematically illustrating an exemplary configuration of the CVVD apparatus 200 in the method according to the embodiment of the present invention.

The CVVD apparatus 200 includes a camshaft 210 having a camshaft slot 212 formed therein, and a cam part 220 provided in the camshaft 210 such that a phase of the cam part 200 may be varied relative to the camshaft 210, wherein the cam part 200 has cams 221 and 222 and a cam slot 224 and has a center of rotation that coincides with that of the camshaft 210.

The CVVD apparatus 200 includes a roller guide part 230, and the roller guide part 230 is connected to the camshaft slot 212 and the cam slot 224 therein. One end of the roller guide part 230 is coupled to the engine through a hinge 231 and a bracket 250, and the other end thereof is formed with a control slot 232. In addition, the CVVD apparatus 200 includes a control shaft 240 that is provided in parallel to the camshaft 210 and has a control pin 241 inserted into the control slot 232, the control pin 241 being eccentric from the center of the control shaft 240.

The roller guide part 230 has a center of rotation that is parallel to that of the camshaft 210, and the center of rotation of the roller guide part 230 may be moved by an actuator or a motor that is controlled by the controller 500. By a difference between the center of rotation of the roller guide part 230 and the center of rotation of the camshaft 210, a phase angle of the cam slot 224 relative to the camshaft slot 212 may be varied and a rotational speed of the cam part 220 relative to the camshaft 210 may thus be varied. Through such a structure, a valve duration, which is an elapsed time between the opening and closing times of a valve lift, may be varied.

In addition, the CVVD apparatus 200 may vary the valve duration by fixing a valve opening time or a valve closing time and changing the other time according to the design position of the hinge 231. Alternatively, the CVVD apparatus 200 may vary the valve duration by fixing a peak lift and varying the valve opening time and the valve closing time.

Although the method according to the embodiment of the present invention is not limited to use for the CVVT apparatus 100 and the CVVD apparatus 200 that are illustrated in FIGS. 2 and 3, it is applicable to apparatuses that can vary a valve timing and duration.

Figure 4:
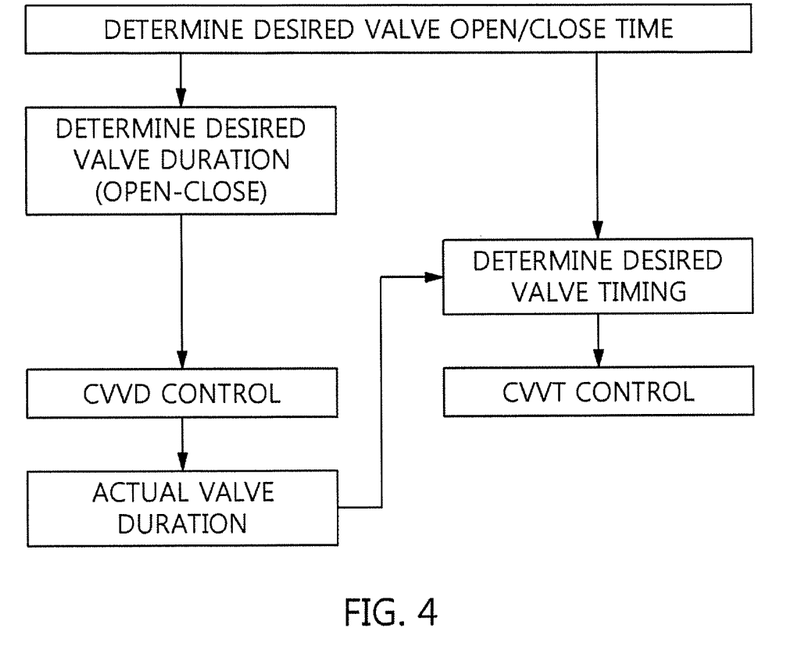
FIG. 4 shows a flowchart illustrating the method according to the embodiment of the present invention.

FIG. 4 shows a flowchart illustrating the method according to the embodiment of the present invention. As illustrated in FIG. 4, the controller 500 first sets a desired valve timing and a desired valve duration that are best suited for vehicle driving conditions. In general, a valve switching timing is fixed such that the engine is able to obtain maximum power in a specific rpm range. Therefore, the desired valve timing and valve duration are set to determine an optimum valve switching timing considering the current rpm and load of the engine.

To this end, it is preferable that the controller 500 first set opening and closing times of the valve 600 that allows intake/exhaust air to be introduced into/discharged from the combustion chamber (S100). When the opening and closing times of the valve 600 are set, the valve duration of the valve lift is determined by a difference between a desired valve opening time and a desired valve closing time.

Meanwhile, the desired valve timing is calculated through the set valve opening time and a current actual valve duration.

When the desired valve timing is set and the desired valve duration is determined, the CVVT apparatus 100 and the CVVD apparatus 200 are controlled to accomplish desired values, respectively. When the valve duration is changed by controlling the CVVD apparatus 200, the valve opening time is changed. For this reason, the valve 600 may not be opened at the valve timing that is originally intended.

However, the CVVT apparatus 100 is determined by the desired valve opening time and the actual valve duration, as described above. Accordingly, the actual valve duration, which varies depending on the control of the valve duration, is detected in real time, the desired valve timing is set through the detected actual valve duration and the desired valve opening time, and the CVVT apparatus 100 is controlled to be suitable for the desired valve timing. Therefore, the valve opening time may be changed depending on the change in valve duration.

Here, the actual variable valve duration may be obtained from measured values of a sensor system that includes at least one sensor and is installed in an actuator or a motor to give the relative phase angle between the camshaft 210 and the cam part 220 in the CVVD apparatus 200.

The controller 500 controls the CVVT apparatus 100 and the CVVD apparatus 200, respectively, until the desired valve timing and valve duration are finally accomplished. Through such a structure, even when the valve timing is changed depending on the control of the valve duration, it is possible to accurately control the valve duration and the valve timing that are originally intended.

FIGS. 5A-5D show a view illustrating the control behavior of the valve lift in method according to the embodiment of the present invention. The control behavior illustrated in FIGS. 5A-5D are examples of the CVVD apparatus 200 that is used to change the valve duration by fixing the peak lift and varying the valve opening and closing times during the control of the valve duration.

Figure 5A:
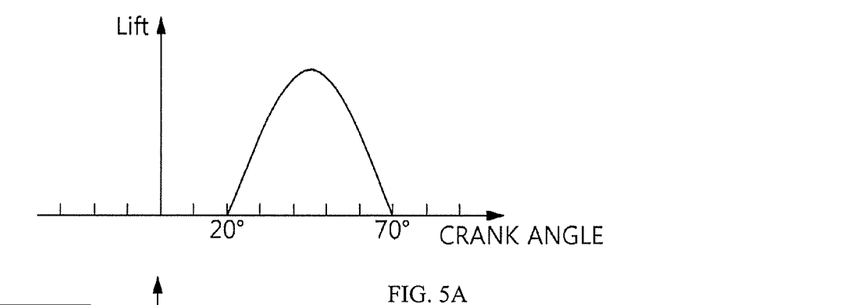
FIGS. 5A through 5D show a view illustrating a control behavior of a valve lift in method according to the embodiment of the present invention.

FIG. 5A illustrates the control behavior of the valve lift before the valve timing and the valve duration are variably controlled. In the present state, the valve opening time is at an angle of 20°, and the valve closing time is at an angle of 70° so that the actual valve duration is at an angle of 50°. In this state, the controller 500 of the present embodiment controls the valve such that the desired valve opening time is at an angle of −10° and the desired valve closing time is at an angle of 20°. In this case, the desired valve timing is at an angle of −10° and the desired valve duration is at an angle of 30°.

Figure 5B:
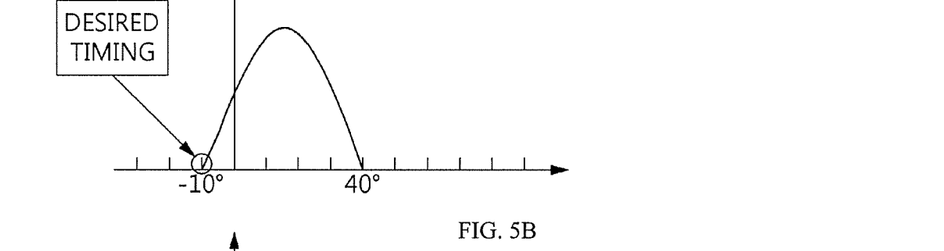
Figure 5C:
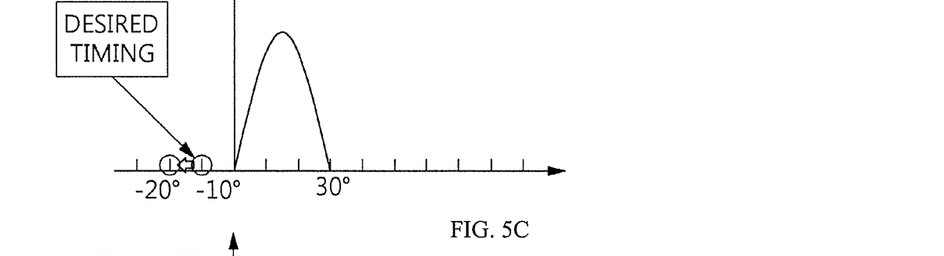

FIGS. 5B and 5C illustrate the control behavior of the valve lift when the CVVT apparatus 100 and the CVVD apparatus 200 are controlled to accomplish the desired valve timing and valve duration.

In general, the valve duration and the valve timing are varied almost at the same time. However, assuming that the valve timing control is extremely performed ahead of the valve duration control, the actual valve duration is at an angle of 50° with no change and the desired valve opening time is at an angle of −10°. Therefore, as illustrated in FIG. 5B, only the angle at which the valve timing is set changed from 20° to −10°, at which the desired valve timing is set, in a state in which the valve duration (angle of 50° in the example) is not nearly changed.

Thereinafter, when the valve duration is controlled, the angle at which the valve duration is set changed from 50° to 30° as illustrated in FIG. 5C. In this case, since the valve duration is varied in this way, the valve opening and closing times are changed so that the valve is opened at an angle of 0° instead of an angle of −10° at which the actual desired valve opening time is set.

Figure 5D:
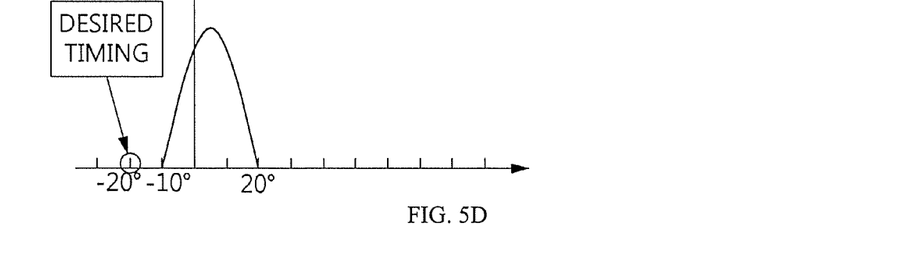

However, in the method according to the embodiment of the present invention, the desired valve timing is calculated by the desired valve opening time (angle of −10°) and the current actual valve duration (angle of 30°). Therefore, the CVVT apparatus 100 is controlled such that the desired valve timing is accomplished by setting to an angle of −20°. As a result, as illustrated in FIG. 5D, it is possible to accomplish the valve opening time and the valve duration that are originally intended since the desired valve opening time is at angle of −10°, the desired valve closing time is at an angle of 20°, and the valve duration is at an angle of 30°.

Although the control behavior illustrated in FIGS. 5A through 5D are examples of the CVVD apparatus 200 that is used to change the valve duration by fixing the peak lift and varying the valve opening and closing times during the control of the valve duration, the present invention is not limited thereto. For example, even when the CVVD apparatus 200 is used to change the valve duration by fixing the valve closing time and varying the valve opening time, the actual valve timing is changed by changing the valve duration. Accordingly, even in this case, it is possible to accomplish the desired valve opening time and valve duration by changing the desired valve timing with reference to the desired valve opening time and valve duration.

If the valve timing is adjusted so as to achieve the desired valve opening time after the completion of the controlling of the valve duration, the valve timing may be advanced or retarded in undesirable way before the completion of the controlling of the desired valve timing. However, in accordance with a method of controlling valve timing and valve duration according to exemplary embodiments of the present disclosure, such problem can be minimized by changing the desired valve timing with reference to the desired valve opening time and valve duration.

In accordance with a method of controlling valve timing and valve duration according to exemplary embodiments of the present invention, it is possible to accurately control a desired valve timing and duration with ease according to the operation state, and thus to improve power and fuel efficiency of a vehicle.

While the present invention has been described with respect to the specific embodiments, it will be apparent to those skilled in the art that various changes and modifications may be made without departing from the spirit and scope of the invention as defined in the following claims.

What is claimed is:

1. A method of controlling valve timing and valve duration using a continuously variable valve timing (CVVT) apparatus and a continuously variable valve duration (CVVD) apparatus, the CVVT apparatus being configured to adjust an opening time of a valve in a vehicle engine, the CVVD apparatus being configured to adjust a duration of a valve lift, the method comprising:
    determining, by a processor, a desired valve opening time and a desired valve closing time;
    determining, by the processor, a desired valve duration by the desired valve opening time and the desired valve closing time;
    determining, by the processor, a desired valve timing through the desired valve opening time and an actual valve duration measured in real time; and
    controlling, by the processor, the CVVD apparatus to accomplish the desired valve duration while controlling the CVVT apparatus to accomplish the desired valve timing.

2. The method of claim 1, wherein the CVVD apparatus adjusts a valve duration by fixing a peak lift of the valve and changing opening and closing times of the valve.

3. The method of claim 1, wherein the CVVD apparatus adjusts a valve duration by fixing a closing time of the valve and changing an opening time of the valve.

4. A system of controlling valve timing and valve duration using a continuously variable valve timing (CVVT) apparatus and a continuously variable valve duration (CVVD) apparatus, the CVVT apparatus being configured to adjust an opening time of a valve in a vehicle engine, the CVVD apparatus being configured to adjust a duration of a valve lift, the system comprises a controller that includes a processor configured to:
    determine a desired valve opening time and a desired valve closing time;
    determine a desired valve duration by the desired valve opening time and the desired valve closing time;
    determine a desired valve timing through the desired valve opening time and an actual valve duration measured in real time; and
    control the CVVD apparatus to accomplish the desired valve duration while controlling the CVVT apparatus to accomplish the desired valve timing.

5. The system of claim 1, wherein the CVVD apparatus adjusts a valve duration by fixing a peak lift of the valve and changing opening and closing times of the valve.

6. The system of claim 1, wherein the CVVD apparatus adjusts a valve duration by fixing a closing time of the valve and changing an opening time of the valve.

* * * * *